United States Patent
O'Krafka et al.

(10) Patent No.: US 7,856,421 B2
(45) Date of Patent: Dec. 21, 2010

(54) MAINTAINING MEMORY CHECKPOINTS ACROSS A CLUSTER OF COMPUTING NODES

(75) Inventors: Brian W. O'Krafka, Austin, TX (US);
Darpan Dinker, Union City, CA (US);
Michael J. Koster, Bridgeville, CA (US)

(73) Assignee: Oracle America, Inc., Redwood City, CA (US)

( * ) Notice: Subject to any disclaimer, the term of this patent is extended or adjusted under 35 U.S.C. 154(b) by 327 days.

(21) Appl. No.: 11/750,664

(22) Filed: May 18, 2007

(65) Prior Publication Data

US 2008/0288556 A1 Nov. 20, 2008

(51) Int. Cl.
*G06F 7/00* (2006.01)
(52) U.S. Cl. ..................... 707/633; 707/610
(58) Field of Classification Search ............... 707/1–10, 707/201, 610, 633, 999.001–999.01, 999.201
See application file for complete search history.

(56) References Cited

U.S. PATENT DOCUMENTS

| | | | |
|---|---|---|---|
| 5,428,766 A | 6/1995 | Seaman | |
| 6,026,504 A | 2/2000 | Hagiwara | |
| 6,536,000 B1 | 3/2003 | Jackson et al. | |
| 2002/0087807 A1 | 7/2002 | Gharachorloo et al. | |
| 2004/0015723 A1* | 1/2004 | Pham et al. | 713/201 |
| 2005/0278565 A1* | 12/2005 | Frattura et al. | 714/5 |
| 2006/0075057 A1 | 4/2006 | Gildea et al. | |
| 2006/0101097 A1* | 5/2006 | Barboi et al. | 707/204 |
| 2006/0212754 A1 | 9/2006 | Yamaguchi et al. | |
| 2006/0259542 A1* | 11/2006 | Wu et al. | 709/202 |
| 2007/0214333 A1 | 9/2007 | Nijhawan et al. | |

OTHER PUBLICATIONS

Anonymous (Wikipedia Definition), "Telephone Tapping", Feb. 28, 2009, Wikipedia, p. 1.*

* cited by examiner

*Primary Examiner*—Mohammad Ali
*Assistant Examiner*—John P Hocker
(74) *Attorney, Agent, or Firm*—Rory D. Rankin; Meyertons, Hood, Kivlin, Kowert & Goetzel, P.C.

(57) ABSTRACT

A method and system for increasing reliability and availability of a multi-processor network. A system includes a network with at least two nodes, with each node comprising a multi-processor unit (mpu) and memory. The mpu includes one or more processors and a wiretap unit. The wiretap unit and the memory included in the node are coupled to the processors in the node. The wiretap unit is configured to monitor memory accesses of the processors and convey data indicative of such accesses to a second node. The second node maintains a replica of memory in the first node, and is configured to undo modifications to the memory if needed. In the event of a hardware or software fault, the nodes are configured to restart the application on another node.

13 Claims, 11 Drawing Sheets

MAINTAINING MEMORY CHECKPOINTS ACROSS A CLUSTER OF COMPUTING NODES

BACKGROUND OF THE INVENTION

1. Field of the Invention

This invention relates to computing network systems, and more particularly, to increasing the reliability and availability of a network system.

2. Description of the Relevant Art

High performance computing is often obtained by using high-end servers. In other cases, clusters of multi-processor nodes may be coupled via a network to provide high performance computing. In some cases, a cluster of nodes may have a lower financial cost of a high-end server. However, clusters of multi-processor nodes may lack the availability of high-end server based systems. Consequently, one method to increase the availability of a cluster of multi-processor nodes is memory replication.

Memory replication generally includes maintaining one or more copies of a memory state in the cluster of nodes. One embodiment of the memory state may be the data content of memory and the processor architectural state content during the execution of an application. The memory state may need to be periodically updated in each copy in order to synchronize the copies with one another and with the original copy. If an executing application experiences a fault, the application can be restarted on another processor in another node and the memory state is recovered from the copy of memory state in this particular node. One method of maintaining memory replication for higher availability is by use of software techniques. However, software techniques involve significant overhead and thus, incorporate a performance penalty and scalability limits. Accordingly, efficient methods and mechanisms for managing clusters of computing nodes are desired.

SUMMARY OF THE INVENTION

Systems and methods for achieving high availability and scalability in clusters of multi-processor nodes are disclosed. In one embodiment, the nodes in a computing system are coupled to via a network. The nodes may include one or more processors, memory, and a "wiretap" unit (WT Unit), which may be an application specific integrated circuit (Unit). The WT Unit and the memory included in the node are coupled to the processor(s). The WT Unit is configured to monitor memory accesses of the processors. In one embodiment, the nodes are configured to create copies of the memory state of an application, periodically synchronize the copies at checkpoints, and maintain a list of changes to the memory state between checkpoints.

Also contemplated is a system wherein if a fault occurs during application execution, the clusters are configured to restore the memory state of the copies to the state of the last successful checkpoint. Still further, contemplated are embodiments wherein the clusters are configured to restart the application on another processor included in one of the nodes with a restored copy of the memory state.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE PREFERRED EMBODIMENTS

Figure 1:
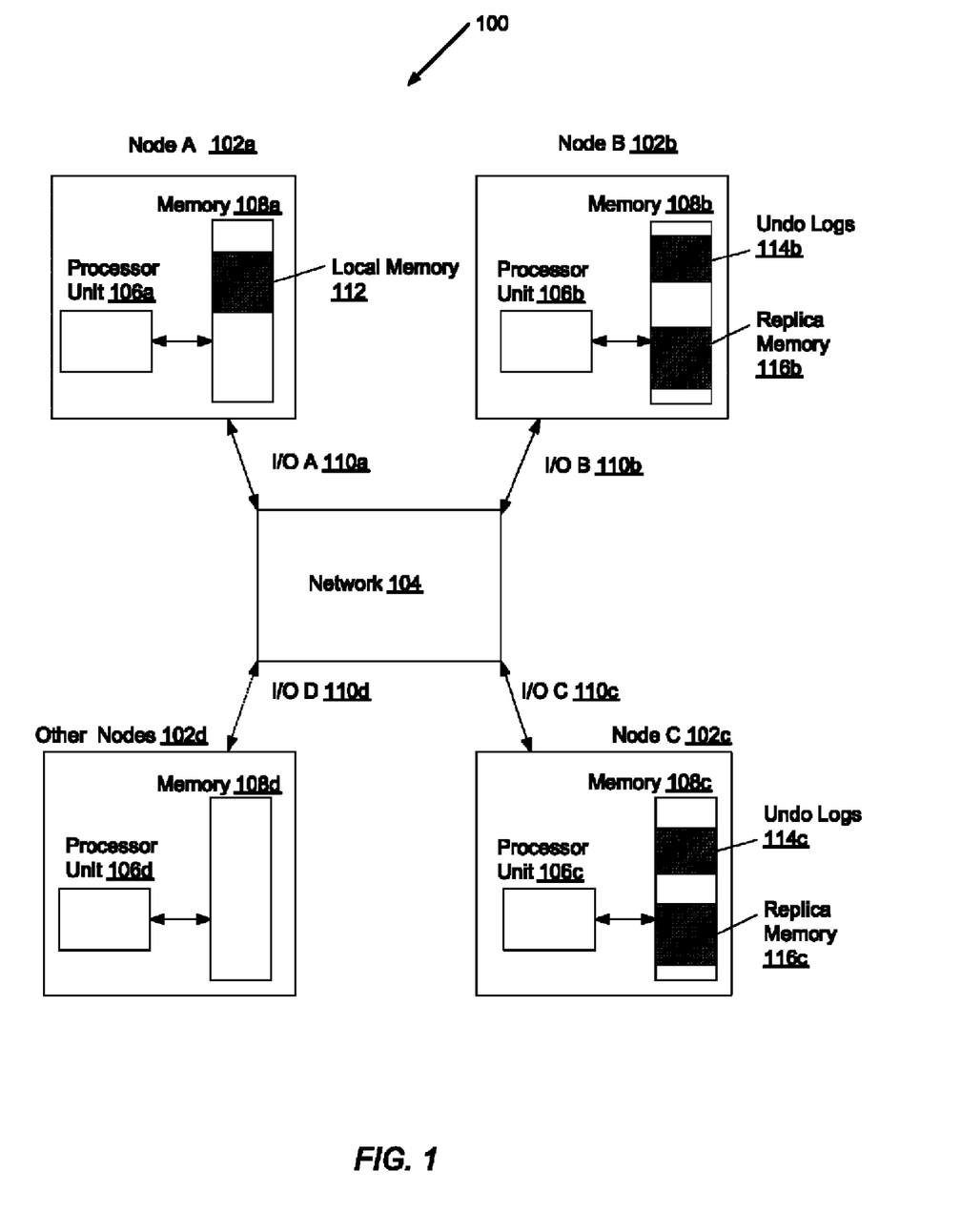
FIG. 1 is a block diagram of a system containing a network and a cluster of nodes.

Referring to FIG. 1, one embodiment is shown of a system 100 that includes a cluster of multi-processor nodes 102a-102d coupled to a network 104 through I/O interfaces 110a-110d. In one embodiment, network 104 may include remote direct memory access (RDMA) hardware and/or software. As shown, nodes 102a-102d include a processor unit 106 and memory 108. Processor unit 106 may comprise one or more processors. Physical memory of system 100 includes memory 108a-108d of all the nodes. The system 100 includes operations, which are described in greater detail below, in order to maintain reliability and availability.

Before a description of the system operation is given, a brief explanation of terminology is provided. For purposes of discussion, the node that includes a processor where an application execution begins is referred to as the local node and its contents include the local processor unit and local memory. The one or more nodes that include a copy of the region of local memory used for the application execution are referred to as the replica nodes. The replica node includes the replica processor unit and replica memory.

Figure 2:
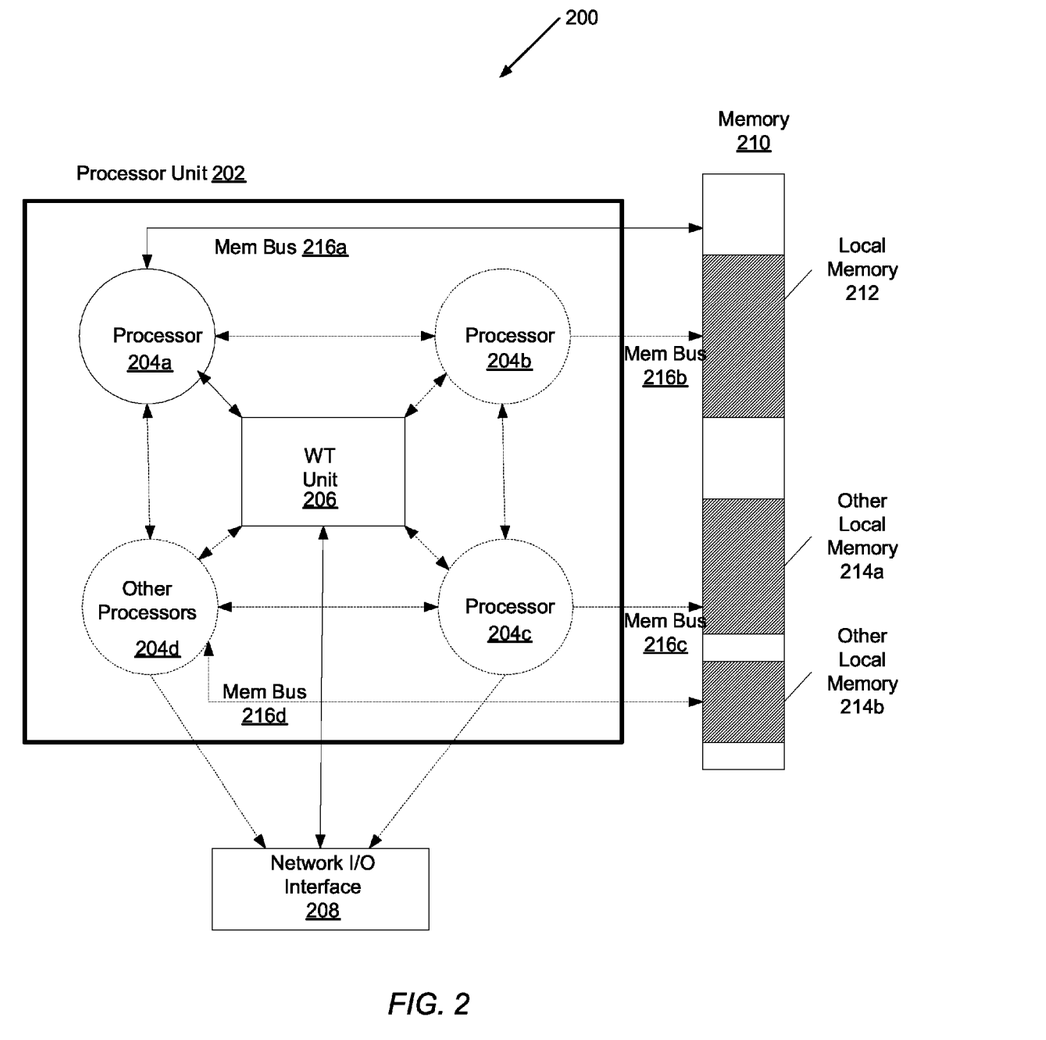
FIG. 2 is a block diagram illustrating one embodiment of a node comprising a processor unit and memory in a network.

Turning now to FIG. 2, one embodiment of a node 200 is illustrated. Node 200 includes a processor unit 202 that comprises one or more processors 204a-204d, memory 210, and a network I/O interface 208. Processors 204a-204d are coupled to a wiretap unit (WT Unit) 206. In one embodiment, WT Unit 206 comprises application specific integrated circuitry. The wiretap portion of the name is described below. Processors 204a-204d and WT Unit 206 are coupled to the network I/O interface 208, which may incorporate RDMA hardware and/or software. Also, processors 204a-204d are coupled to memory 210 within the node through Memory Buses 216a-216d. Each processor 204a-204d may be coupled to its own DRAM, which may be contained in memory 210 in the node. Memory 210 may comprise primary memory for processors 204a-204d and secondary memory of any hard disk drives. Memory 210 may be configured to include a region of memory for the execution of an application, such as Local Memory 212. Also, memory 210 may include multiple regions of memory, such as Other Local Memory 214a-214b, for the simultaneous execution of multiple applications. In one embodiment, in order for each processor 204a-204d to access memory, such as its respective primary memory (e.g., DRAM), each processor 204a-204d must go through WT Unit 206. Therefore, for example, write-back of a dirty cache line in a processor 204a-204d to memory 210 in the node is monitored by WT Unit 206. Because WT Unit 206 "taps" the interface between a processor 204a-204d and memory 210 in the node, it is referred to as a wiretap unit (WT Unit). In fact, WT Unit 206 may make a duplicate, or replica, of the cache line and, through the network I/O interface 208, send the replica to other nodes. Further discussion of this topic is given below. WT Unit 206 is further configured to access the DRAM of any processor 204a-204d. WT Unit 206 may be configured to interface with other nodes, and thus, access the WT ASIC of other nodes.

Figure 3:
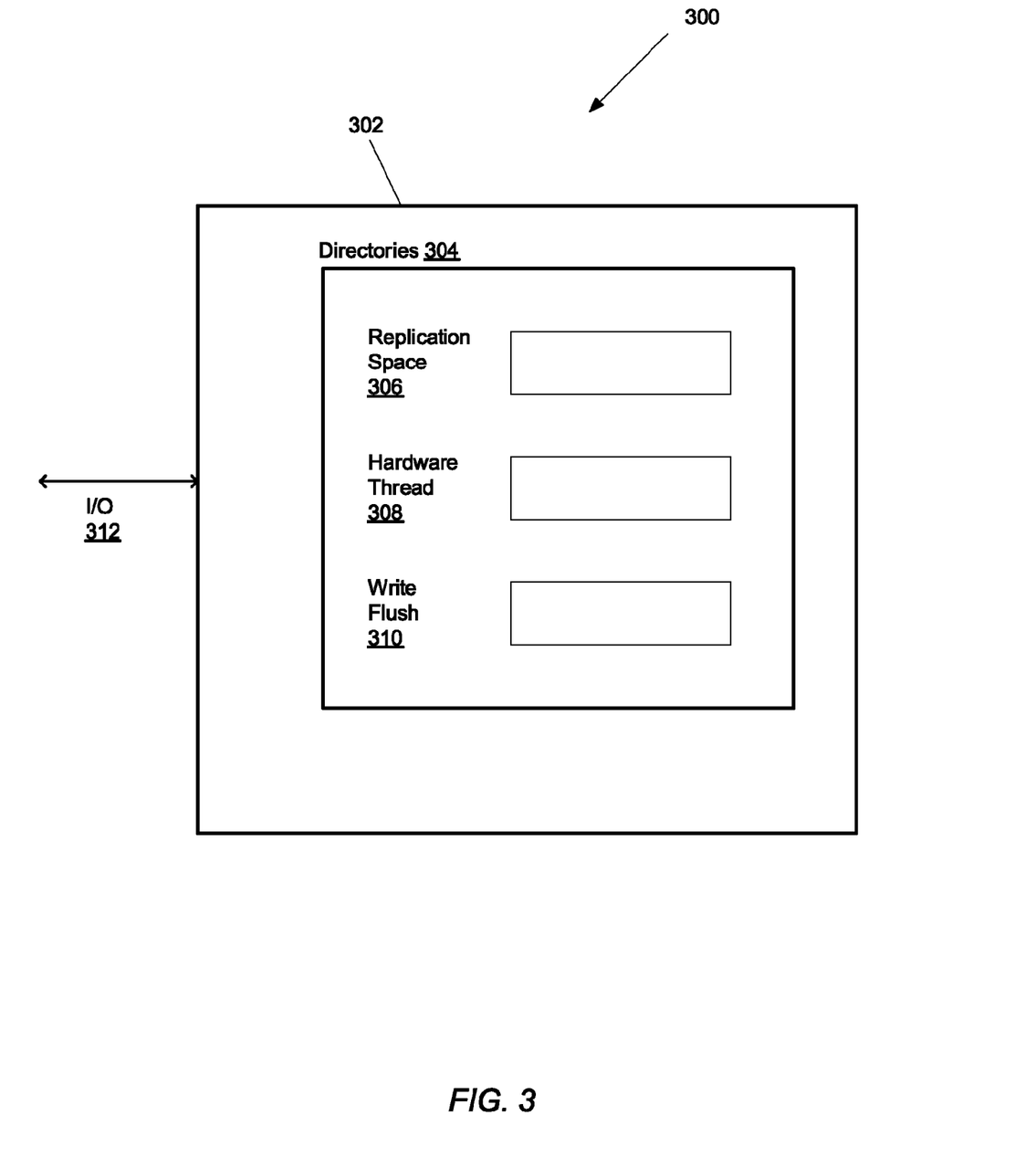
FIG. 3 is a block diagram illustrating one embodiment of a device configured to maintain location information used for memory replication.

FIG. 3 illustrates one embodiment of a wiretap unit (WT Unit) 300. In one embodiment, WT Unit 302 may include an interface, I/O 312, which allows WT Unit 302 to interface with one or more processors, memory, a network, and otherwise. The interface 312 may be configured to include hyper-transport links in the case that AMD Opteron™ processors are used in the nodes. Also, each WT Unit 302 may include directories 304 of locations of information related to the operations of system 100. For example, Replication Space Directory 306 may include an array of entries. Each entry in directory 306 may correspond to information that needs to be maintained during the execution of an application. Such information may include pointers to the start and end of a region of physical memory dedicated to holding all the data. The setup of this region of memory will be described in greater detail below. The data within this region may include the locations of the original and copies of memory used during the execution of the application, the nodes of the original and copies, a pointer to the head of the Write Flush Directory 310, and pointers to the start, end, and current entry of logs used to track operations performed on the memory state in order to possibly later restore the memory state to a predetermined state.

Hardware Thread Directory 308 may be configured to include a map between hardware thread ID's that are transmitted in hyper-transport transactions and a replication space ID to correspond to which allocated space the application will execute.

Write Flush Directory 310 may include a list of cache lines that have been written to for each transaction in progress. When a transaction completes, its corresponding list of cache writes is traversed and each cache line is flushed, or written-back to memory. The entries of this directory may contain a cache ID, the tag of the cache line, and state information.

Figure 4A:
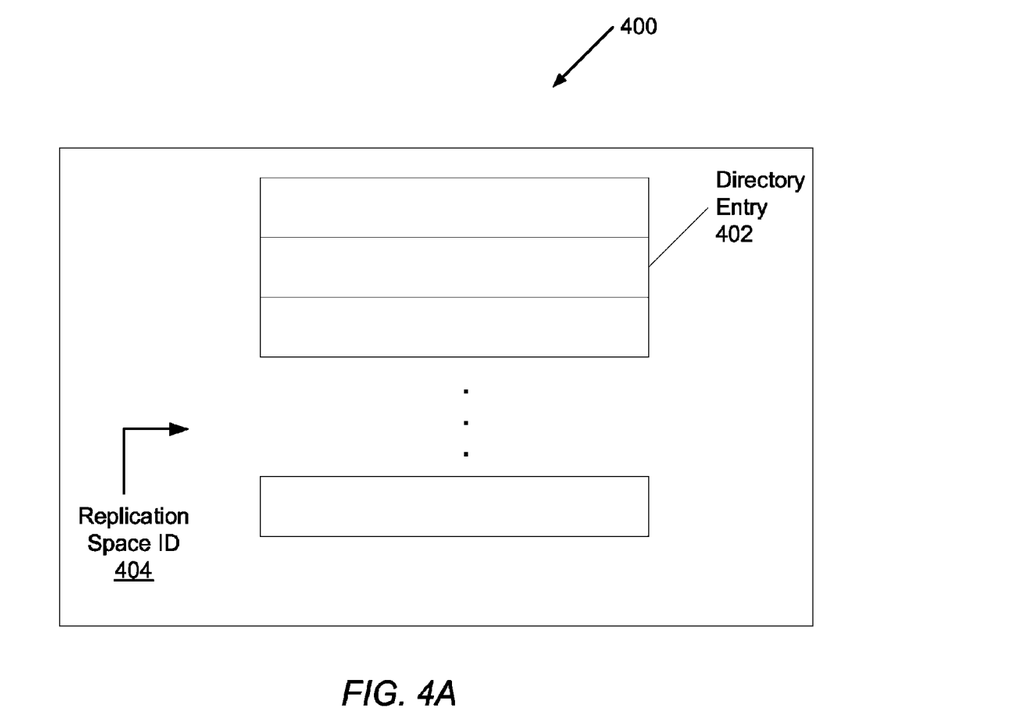
FIG. 4A-4B is a block diagram illustrating one embodiment of a directory structure holding pointers to define regions of memory for memory replication.

FIG. 4A illustrates one embodiment of a Replication Space Directory 400. In one embodiment, directory 400 may be comprised of an array of entries such as Directory Entry 402. The array may be indexed by Replication Space ID 404, which may be provided by a counter in WT Unit shown in FIG. 3. When an application begins, the output of the counter in WT Unit provides an index, Replication Space ID 404, to determine which replication space may be used for the execution of the application. The space is allocated by the operating system prior to any applications running with memory replication. Directory Entry 402 may contain information to be maintained during the execution of an application. Further details of Directory Entry 402 are provided here.

Figure 4B:
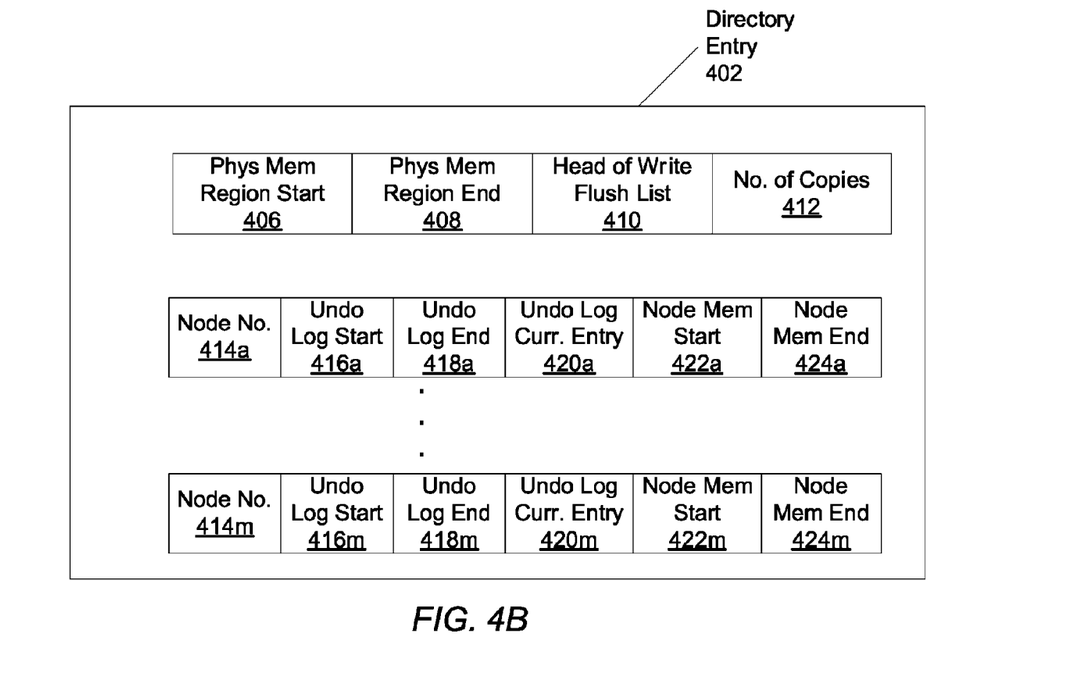

Referring now to FIG. 4B, there is shown one embodiment of Directory Entry 402. Here may be found pointers, Phys Mem Region Start 406 and Phys Mem Region End 408, to the start and end of the region of physical memory which holds the original and copies of data used during the execution of the application and the original and copies of logs of operations performed on original and copies of the memory state. Also there may be a pointer, Head of Write Flush List 410, used to locate the list of dirty cache lines that need to be written-back to memory during a checkpoint operation, a recovery operation, or a completion of the execution of the application. The field, No. of Copies 412, holds the value of the number of copies to be used during execution. This value relates to the number of copies to maintain of the data used during the execution of the application and the logs of the operations performed on the data during application execution. For each copy, several fields are maintained during application execution. Looking at just one copy, for example, the first copy, the fields begin with an index, Node No. 412a. This field denotes which node in system 100 holds the region of memory for this copy. The next three fields detail the location of the Undo Log for this copy. They are Undo Log Start 414a, Undo Log End 416a, and Undo Log Curr. Entry 418a. The first two fields are pointers to the start and end of the region of memory that holds the Undo Log, or list of operations performed on the data during application execution. The third field, Undo Log Curr. Entry 418a, is a pointer to the current entry of the list of operations. The data on which the list of operations is performed lies in the region of memory set by the pointers, Node Mem Start 420a and Node Mem End 422a.

Figure 5A:
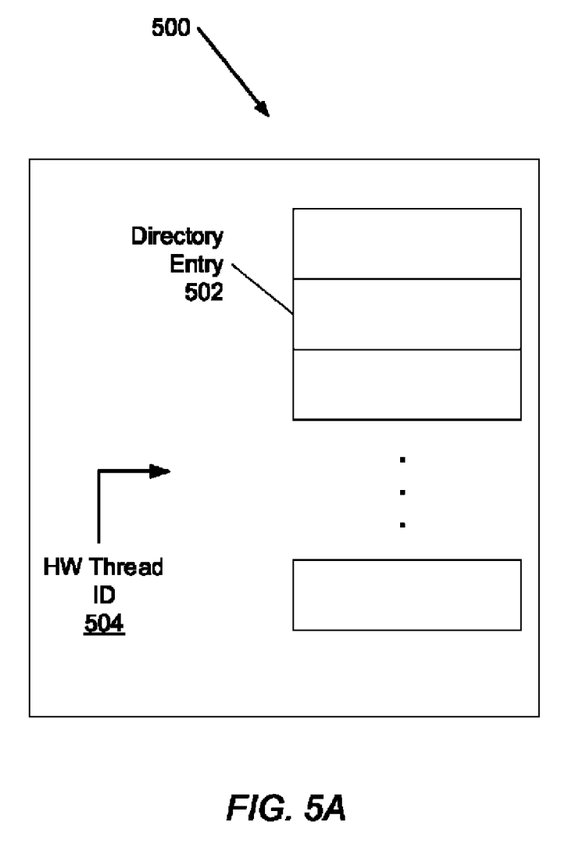
FIG. 5A-5B is a block diagram of a directory structure for mapping a Hardware Thread ID to a Replication Space ID.
Figure 5B:
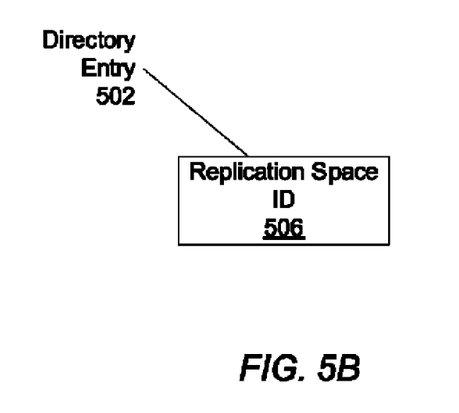

Referring to FIG. 5A, one embodiment of a Hardware Thread Directory 500 is illustrated. As mentioned above, directory 500 may be configured to include a map between hardware thread ID's that are transmitted in hyper-transport transactions and a replication space ID to correspond to which allocated space the application will execute. A Hardware Thread ID 504 is used to index directory 500 to obtain an entry 502. FIG. 5B illustrates one embodiment of a directory entry 502 that may include a replication space ID 506 that specifies the allocated space for the local and copy regions of memory to be used during application execution.

Figure 6A:
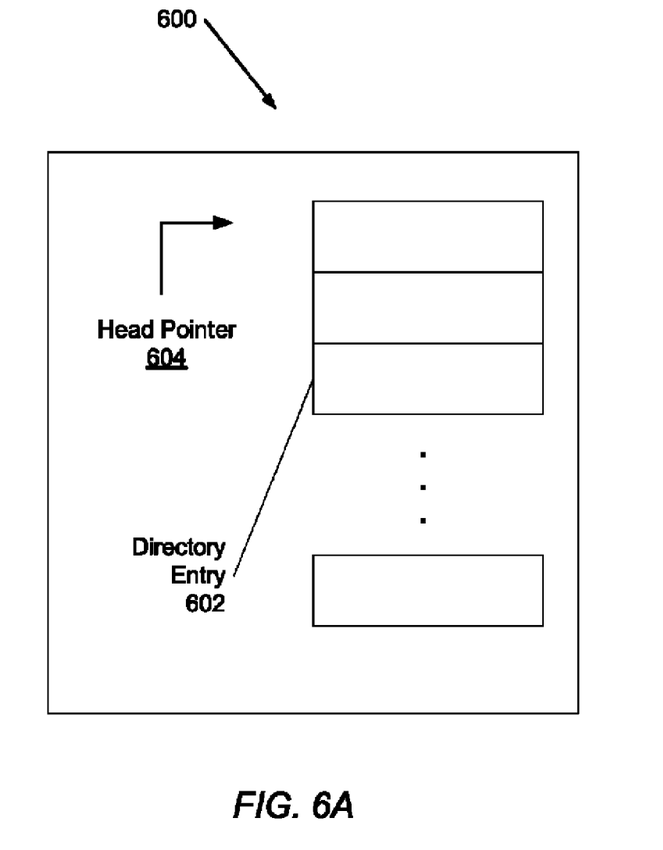
FIG. 6A-6B is a block diagram of a directory structure for storing information of dirty cache lines in a node.

FIG. 6A illustrates one embodiment of a Write Flush Directory 600. During a checkpoint operation, a recovery operation, both are further discussed below, or a completion of an execution of an application, directory 600 is located by a Head Pointer 604. This pointer is located in the Replication Space Directory in FIG. 3. The list of entries, such as Directory Entry 602, is traversed, and dirty cache lines are written-back to memory.

Figure 6B:
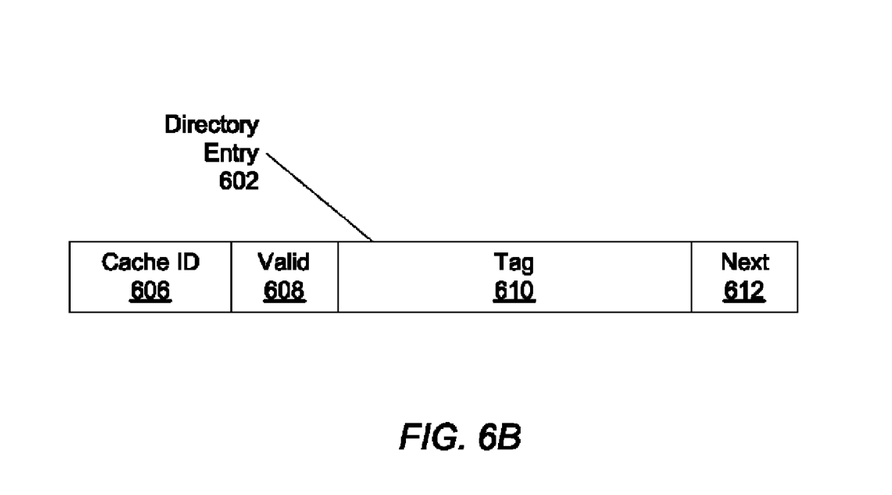

Referring now to FIG. 6B, an embodiment of each entry in directory 600 is illustrated. The first field, Cache ID 606, may be the location of the cache containing the dirty line. Next is Valid 608 which is the state information of the dirty cache line and it may be valid or invalid. The tag of the address of the dirty line follows with field Tag 610. Finally, Next 612 is a pointer to the next write flush entry for this application.

Figure 7:
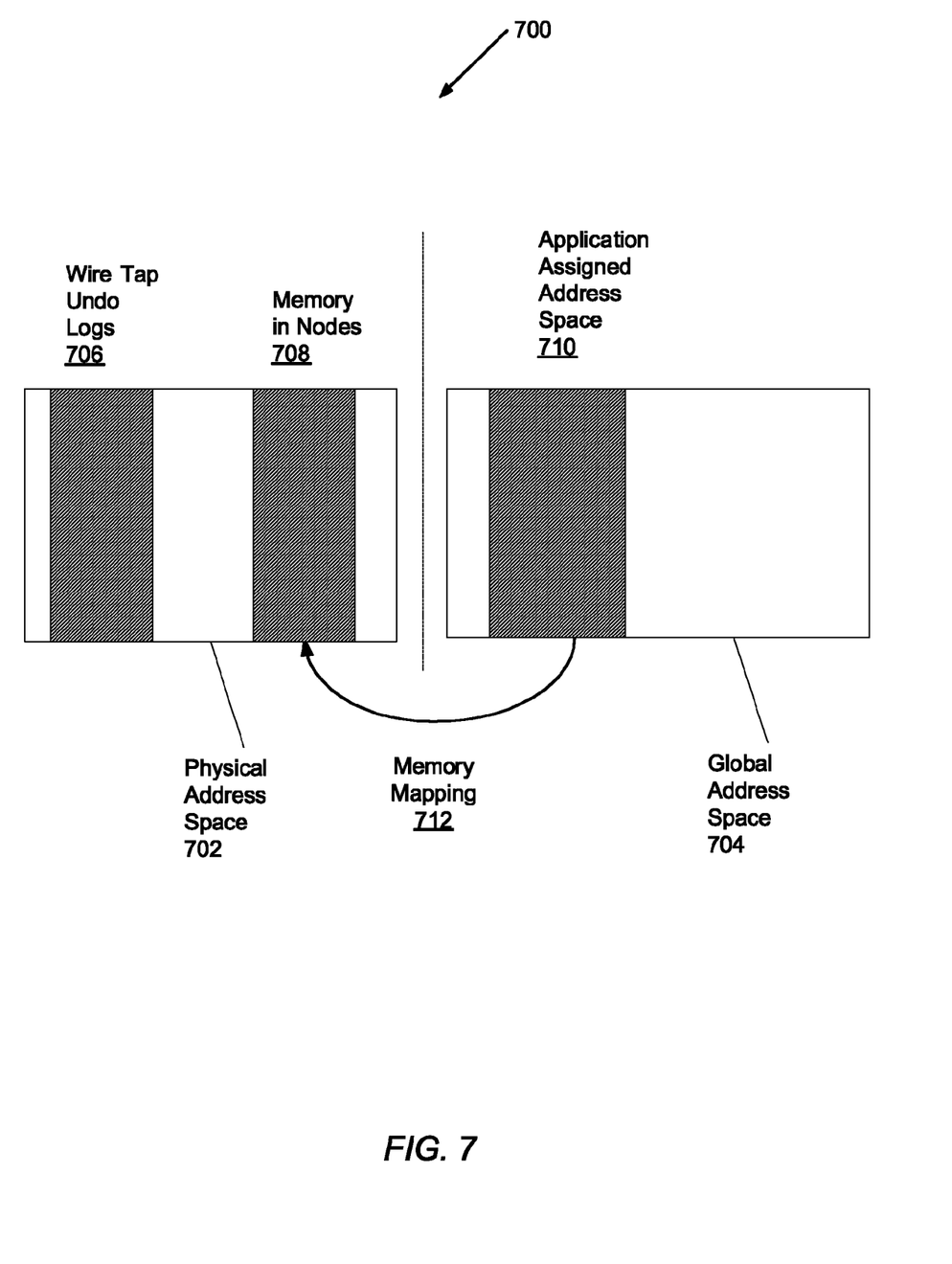
FIG. 7 is a block diagram illustrating one embodiment of memory mapping between address space and physical memory.

FIG. 7 illustrates one embodiment of memory mapping 700. Mapping 700 may occur between global address space 704, or the virtual address space for system 100, and physical address space 702 of system 100. In general, the operating system moves data between physical locations to improve performance or ensure reliability. For each application, the operating system creates a single virtual memory space. For system 100, an application may only access addresses in space 704 that are set by WT Unit such as Application Assigned Address Space 710. These virtual addresses are mapped to the physical addresses Memory in Nodes 708 through Memory Mapping 712. Addresses 708 are the addresses of the DRAM of the processors in the node running the application. Memory Mapping 712 may be implemented with a combination of a translation lookaside table (TLB) and a page table. Also, Wire Tap Undo Logs 706 are stored in Physical Address Space 702. Wire Tap Undo Logs 706 may be used to store operations performed on memory 708 during the execution of an application between checkpoints. Later, if necessary, the memory state of the last successful checkpoint may be restored by traversing the operations in Wire Tap Undo Logs 706. A more detail description is given below. The locations of both Wire Tap Undo Logs 706 and Memory in Nodes 708 are known to the WT Unit of the node in the Replication Space Directory in FIG. 4A-4B.

As stated above, WT Unit is configured to interface with the WT Unit of other nodes, and thus, access the memory and processors of other nodes. For example, referring to FIG. 1, an application running on processor 0 of Node 0 may need to modify a line with an address in global address space that corresponds to a line in physical memory of Node 2 such as the DRAM of processor 3 of Node 2. The WT Unit in all nodes contain access to this mapping. In this case, WT Unit 0 may interface with WT Unit 2 in order to allow the application running on processor 0 of Node 0 to temporarily run on processor 3 of Node 2.

Overview of the Setup Process

Initially, a setup operation for system 100 may be performed. During setup, space in physical memory may be allocated as shown in FIG. 7. Physical memory includes the memory in all nodes in FIG. 1, which may be comprised of memory for the processors in the processor units 106a-106d and any disk drives. The allocated space for the execution of the application in physical memory may be configured to store local memory, for example 112 in FIG. 1, and copies of local memory, or replica memory, for example, 116b-116c in FIG. 1. The allocated space may also be configured to store undo logs such as 114b-114c in FIG. 1. A description of undo logs is given below. Software is required to handle the case when sufficient memory is not available.

Figure 8:
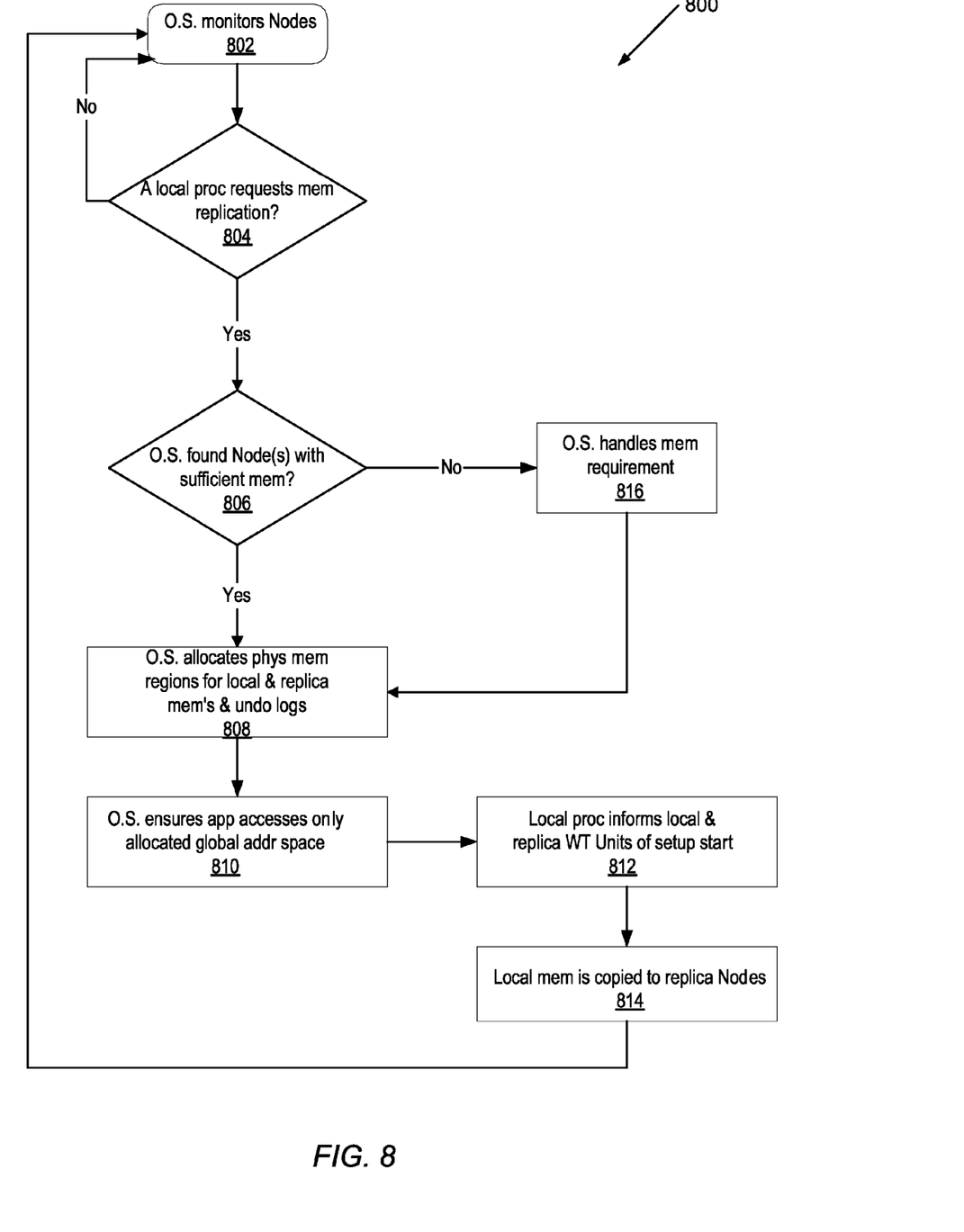
FIG. 8 is a flow diagram of one embodiment of a method for setup of memory replication.

Referring now to FIG. 8, there is shown a flow diagram illustrating one embodiment of a method for setup of memory replication on system 100. The steps in this embodiment are shown in sequential order. However, some steps may occur in a different order than shown, some steps may be performed concurrently, some steps may be combined with other steps, and some steps may be absent in another embodiment. In the embodiment shown, the operating system (O.S.) monitors the nodes in system 100 in block 802. During this monitoring, a processor (i.e. processor 204a-204d of FIG. 2) in system 100 may request memory replication such as in decision block 804. The node of this processor will be denoted as the local node. The one or more nodes chosen to hold the copy, or replica, of the local memory will be denoted as the replica node(s). If a request is not made, the O.S. continues to monitor the nodes in system 100. If a processor does have an application to execute and the processor requests memory replication, then steps are taken to find allocated space in system 100 for execution of the application.

In order to make the request for memory replication, a local processor may program the local WT Unit to perform setup. Before further explanation of setup is given, a brief description of the interface of WT Unit 206 is provided in order to determine how to begin indexing the directories in WT Unit. A Hardware Thread ID may be used to index the Hardware Thread Directory in FIG. 3. This indexing may lead to obtaining a Replication Space ID as shown in FIG. 5A-5B. Another alternative to obtaining a Replication Space ID is to use a counter for the Hardware Thread ID. Such a counter may be located in the WT Unit. Indexing of a directory as shown in FIG. 5A-5B would continue. With either alternative, if a valid Replication Space ID is not found, meaning the value may be out of a predetermined range or a status bit may be stored with the ID value, then there is no sufficient memory in physical memory for the application execution. This is shown in decision block 806. In this case, the O.S. must handle the situation and allow memory to become available as shown in block 516. Perhaps the O.S. simply waits for other applications to finish and when it detects a valid Replication Space ID is available, its highest priority at that time is to allow the current application to obtain it.

Once sufficient memory and a valid Replication Space ID are available, block 808 shows the O.S. has regions of memory allocated for the execution of the application. Again, a brief explanation of terminology is given. The node that includes a processor where an application execution begins is referred to as the local node and its contents include the local processor unit and local memory. The one or more nodes that include a copy of the region of local memory used for the application execution are referred to as the replica nodes. A replica node includes a replica processor unit and a replica memory. The purpose of the replica nodes is to maintain copies of the local memory during application execution as shown in FIG. 1. Also, the replica nodes may include regions of memory to store undo logs. The undo logs may include a list of operations performed on the local memory. Should a fault, hardware or software, occur, the replica nodes may use the undo logs to restore the replica memory to a predetermined state. Then one of the replica nodes is chosen to restart the application and become the new local node.

FIG. 4A-4B illustrates the Replication Space ID indexes the Replication Space Directory located in the WT Unit shown in FIG. 3. Here, each entry 402 includes pointers that define the regions of memory for local memory, replica memories, and undo logs. These regions are shown in FIG. 1 in 112, 114b-114c, and 116b-116c.

In the next block, 810, the O.S. ensures the application accesses a virtual memory range 710 determined by the WT Unit. The physical addresses 708 are already determined by WT Unit 206 and the Replication Space Directory entry 402. In one embodiment, a combination of a translation lookaside buffer and a page table may be used to perform the memory mapping 712. All WT Unit's of all nodes include this mapping or have access to this mapping. In block 812, the local processor of the local node informs the local WT Unit 206 and the replica WT Unit's that setup has begun. In FIG. 1, this may be performed by using the interfaces 110a-110d and network 104. In one embodiment, the local WT Unit may need to wait for an acknowledgment signal from all replica nodes after informing the replica nodes of the start of setup. If all acknowledgment signals do not arrive in a predetermined time, the O.S. may be signaled to handle the current wait state and/or have setup begun again. Another alternative may be to not include acknowledgment signals from the replica nodes, and instead, the next step is taken. Local memory is copied to the replica nodes in block 814. Again, interfaces 110a-110d and network 104 may be used for the transmission of local memory contents. For example, in FIG. 1, Local Memory 112 is copied to Replica Memory 116b and 116c. Upon completion of the copying, the method returns to block 802 and the O.S. monitors all nodes for memory replication requests.

Overview of the Wiretap Process

Figure 9:
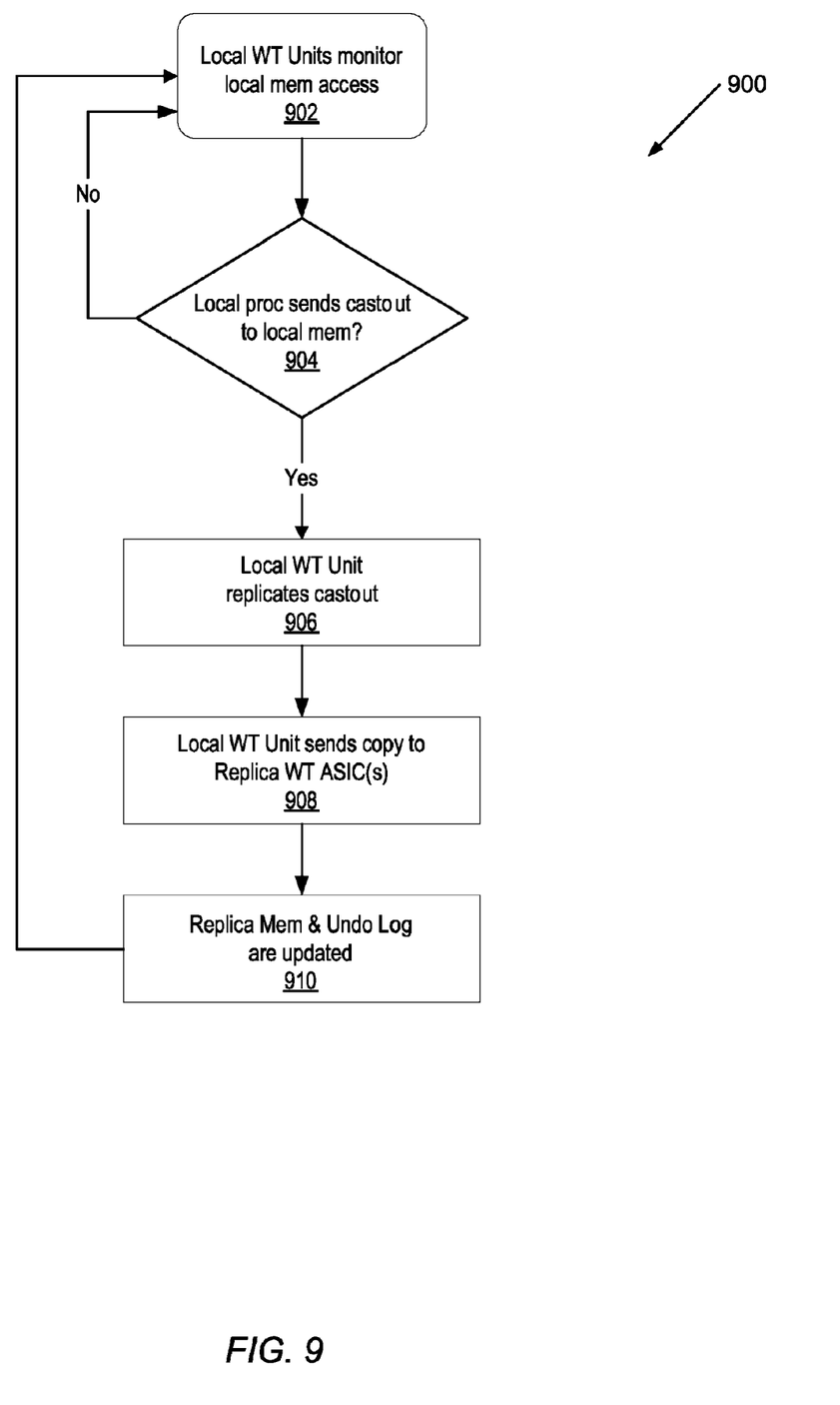
FIG. 9 is a flow diagram of one embodiment of a method for updating copies of memory used for an application and for updating a log of memory changes.

FIG. 9 is a flow diagram of one embodiment of a method for memory line wiretap on system 100. For example, within local processor unit 106a of FIG. 1, an application may be executing on local processor 204a of FIG. 2. Recall WT Unit 206 is aware of any castout, or dirty cache line that is being written-back to memory 210.

If in decision block 904, the local processor issues a castout to memory 210, WT Unit 206 makes a replica, or duplicate of the castout, as in block 906. Otherwise, WT Unit 206 continues to wait for a memory access from one of the processors 204a-204d in block 902.

Following a replication of a castout, in block 908, the local WT Unit sends the replica memory line to network 104 in FIG. 1. Then network 104, using interfaces 110a-110c, sends the replica memory line to replica WT Units such as in processor units 106b-106c. At this point, in block 910, the replica WT Units perform a write operation to replica memory, such as Replica Memory 116b-116c. Also the WT Units add a change record to the Undo Logs 114b-114c. At this point, local memory 112 has been updated with the original castout, replica memories 116b-116c have been updated with the replica memory line, and undo logs 114b-114c have been updated with a recorded change.

In one embodiment, after sending the castout to network 104, the local WT Unit may need to wait for an acknowledgment signal from all replica nodes. If all acknowledgment signals do not arrive in a predetermined time, the O.S. may be signaled to handle the current wait state and/or have the wiretap process begun again at the point of sending the replica memory line to the replica nodes through network 104. Another alternative may be to not include acknowledgment signals from the replica nodes, and instead, the next step is taken. Following block 912, the method returns to block 902 where the local WT Unit waits for a memory access from the local processor.

Overview of the Synchronization Process

Replica memories 116b-116c need to periodically be in a consistent state with one another and the state of the local memory 112. While an application executes on local node 102a and local memory 112 is updated, replica memories 116b-116c are no longer synchronized with local memory 112. Undo logs 114b-114c maintain a list of changes in order to make it possible to update replica memories 116b-116c to the state of local memory 112. In one embodiment, undo logs 114 are limited in size. There are at least a couple of reasons to maintain a limit to the size of undo logs 114b-114c. One reason may be to limit the size of the regions needed to store the undo logs in memory, such as memories 108b-108c. Another is to reduce the penalty of recovery in the case a hardware or software fault occurs. If replica memories 116b-116c were not periodically updated, then after a fault, the entire list of changes that occurred since the application began would need to be performed on the replica memories before progress in execution could proceed. Compared to a smaller list of changes that occurred since the last periodic update, or checkpoint, having no limit may significantly reduce availability of system 100.

Therefore, periodic updates, or checkpoints, are added to the application software to periodically synchronize the replica memories 116b-116c to the local memory 112. Should a hardware or software failure occur, one of the replica nodes 102b-102c may become the new local node. Undo logs 114b-114c will be used to restore replica memories 116b-116c to the state of local memory 112 at the last successful checkpoint. Recall that the replica memories 116b-116c may have been updated with castouts, a method described above, since the last successful checkpoint. This process of synchronization is initiated when software periodically invokes the hardware checkpoint function. A detailed description of the hardware checkpoint function, or synchronization, is given below.

Figure 10:
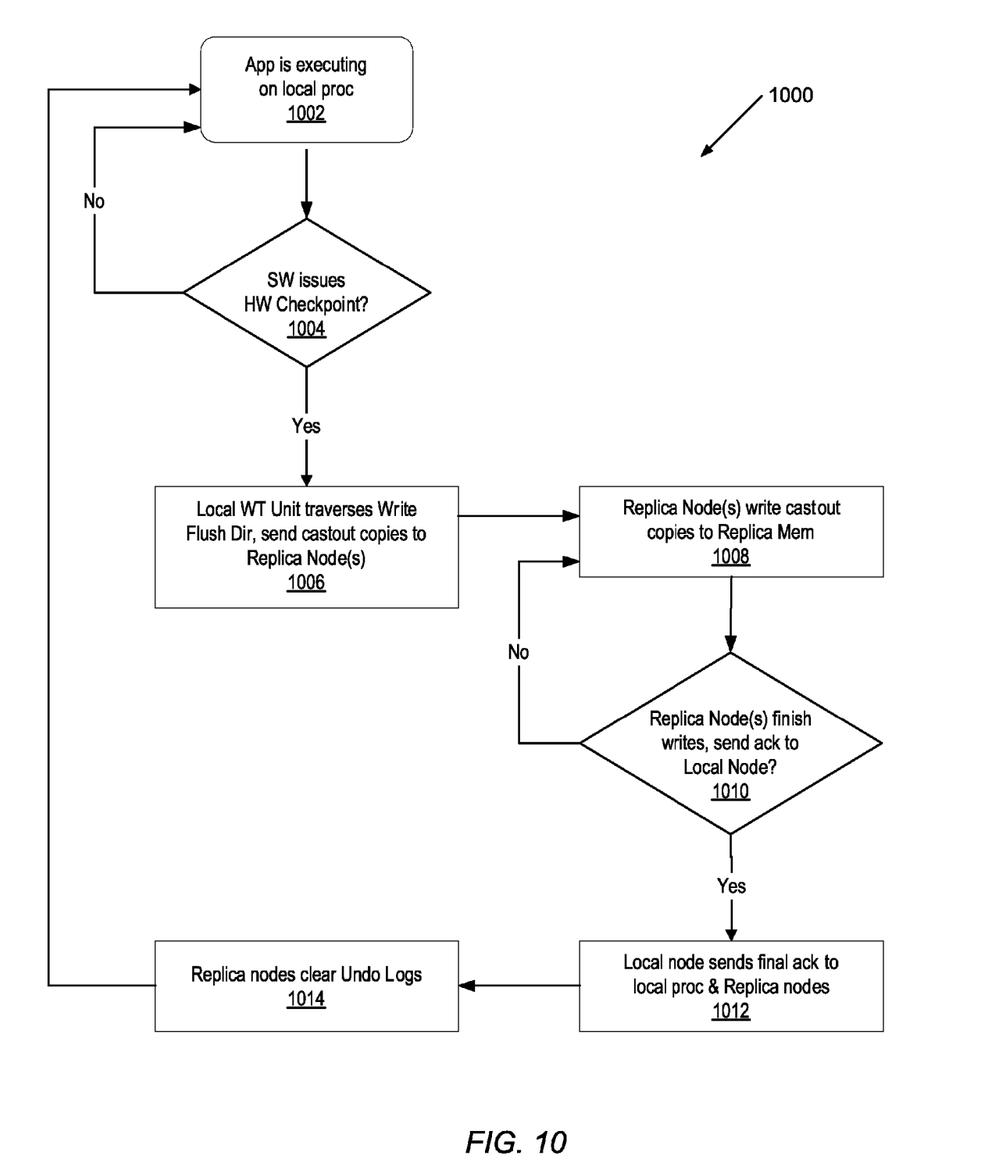
FIG. 10 is a flow diagram of one embodiment of a method for synchronizing the memory used for an application and its copies.

Referring to FIG. 10 a flow diagram is shown of one embodiment of a method for synchronization on system 100. In block 1002, the setup process has completed and the wiretap process may be performed when needed as an application is being executed on a local processor on local node, for example, node 102a in FIG. 1. The application is using local memory 112.

Periodically, the application software invokes a hardware checkpoint. If in decision block 1004, the application software has not invoked a hardware checkpoint, the process returns to block 1002 and waits for a checkpoint. When a checkpoint is issued in decision block 1004, all dirty cache lines in the local processor need to be written-back to local memory 112 in block 1006. Local WT Unit uses the pointer, Head Write Flush 410 in the Replication Space Directory 306, to locate the beginning of the Write Flush Directory 310. An entry in this directory, for example Directory Entry 602, includes a cache ID 606 to locate the local processor with the dirty cache line, a valid bit 608 to denote if this line should be written-back to memory, a tag 610 of the memory line to be written with the new data, and a pointer, Next 612, to the location of the next entry in the list or possibly a null value to denote the end of the list. Similar to the Wiretap Process described above, the local WT Unit will notify the local processor to write-back the castout, or the current valid dirty line, to local memory 112. Concurrently, local WT Unit will replicate the castout and send the replicate to network 104 through interface 110a. Network 104 will send the replicate to replica WT Units using interfaces 110a-110c.

In block 1008, the replica WT Units accept the replica memory line and send it to the appropriate replica processor in its respective processor unit. The replica processors perform a write operation to replica memories 116b-116c. Note that blocks 1006 and 1008—the process of traversing the Write Flush Directory 310, writing the original dirty cache line to local memory 112, and writing the replica line to replica memories 116b-116c—may be implemented in several ways. One alternative is to have the next entry of Write Flush Directory 310 read once the original cache line is written and the replicas are sent to network 104. Another alternative is to wait to read the next entry until an acknowledgment signal is received from all replica nodes that denotes the replica line was written to replica memories 116b-116c. In one embodiment, buffering of the original castout and replicas may be used to pipeline the write-back procedure or send the castout lines in groups. Another alternative is to have only one acknowledgment signal sent by the replica nodes in response to a signal from the local node identifying a replica is from the final entry, rather than a write-complete acknowledgment signal for each replica.

In decision block 1010, the steps in blocks 1006 and 1008 are performed until the final entry of Write Flush Directory 310 is reached and all replica nodes send an acknowledgment to the local node of the completed write-back of this final replica. If the final entry has been copied and written-back to all replica memories and the local processor is made aware of this fact, then in block 1012, the local WT Unit both sends a final acknowledgment signal to the local processor and, through network 104, sends a final acknowledgment signal all replica nodes through network 104. Otherwise, the process may return to block 1006 or block 1008 depending on the implementation of the Write Flush Directory 310 traversal and write-back of replicas to the replica memories 116b-116c such as the examples listed earlier.

In block 1014, upon receipt of the final acknowledgment signal from the local WT Unit, the replica WT Units inform the replica processors to clear the undo logs. Replica memories 116b-116c are the same as, or synchronized with, local memory 112, so there should be no list of needed changes to perform to restore replica memories with local memory. In one embodiment another acknowledgment signal may be required for the replica WT Units to inform the local WT Unit that the undo logs are successfully purged. The process then returns to block 1002 and the application continues execution on the local node.

Overview of the Recovery Process

As stated above, while an application executes on local node 102a and local memory 112 is updated, replica memories 116b-116c are no longer synchronized with local memory 112. Undo logs 114b-114c maintain a list of changes in order to make it possible to update replica memories 116b-116c to the state of local memory 112. In the event of a hardware or software fault, one of the replica nodes need to be chosen to be a new local node where the application will continue execution. However, first, the replica memories need to be restored to the state of local memory at the last successful checkpoint where synchronization, described above, occurred. This process of recovery from a fault is described below.

Figure 11:
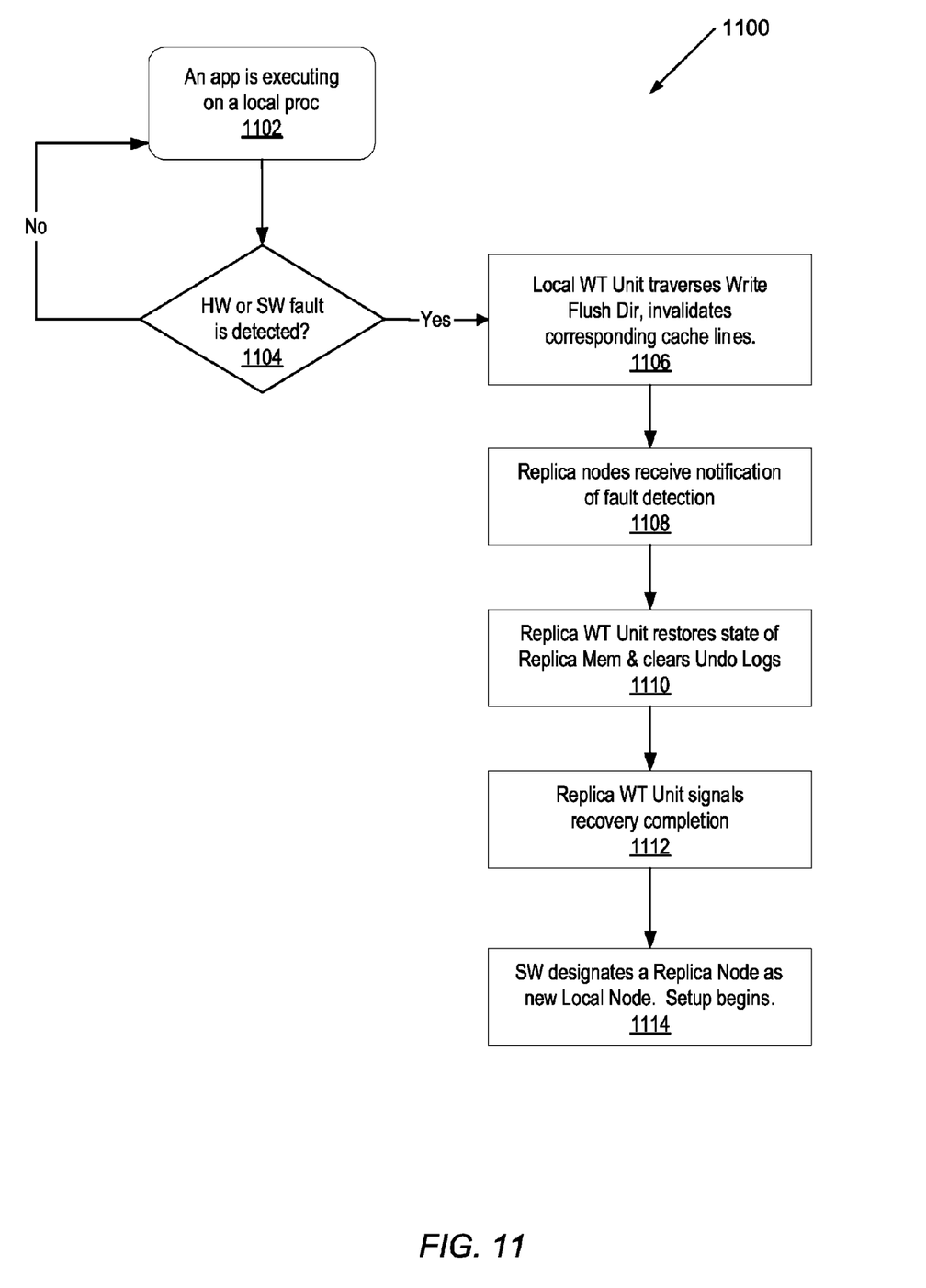
FIG. 11 is a flow diagram of one embodiment of a method for recovery of an application executed on a multi-processor network that experiences a fault.

FIG. 11 is a flow diagram of one embodiment of a method of recovery on system 100 when a hardware or software failure occurs during the execution of an application on, for example, local node 102a of FIG. 1. In block 1102, the setup process has completed on a local node, an application is executing on the local node, the wiretap process may be performed when needed as the application is being executed on the local node, and synchronization may or may not have occurred already.

If in decision block 1104, a hardware or software fault has not been detected during application execution, then the process returns to block 1102. Otherwise, to start recovery from the fault, all dirty cache lines in the local processor need to be invalidated in block 1106. Local WT Unit uses the pointer, Head Write Flush 410 in the Replication Space Directory 306, to locate the beginning of the Write Flush Directory 310. The local WT Unit will notify the local processor to invalidate the dirty cache lines.

In block 1108, the replica nodes receive notification of a fault detection through network 104.

In block 1110, upon receipt of a signal of fault occurrence, the replica WT Units inform the replica processors to restore the replica memories, such as memories 116b-116c in FIG. 1, to the state of both local memory 112 and replica memories at the last successful checkpoint. In one embodiment, the replica WT Units access their respective Replication Space Directory 306 to inform the replica processors of the location of their respective undo logs. The undo log is traversed by the replica processors as directed by the corresponding replica WT Units, or alternatively, as directed by software running on the replica processors. The replica memories are modified according to the operations in the undo logs. This step continues until the last entry of the undo log is reached and, thus, the replica memory in each replica node is restored to the state it possessed at the last successful checkpoint. Then the undo log is cleared, which may occur simply by equating the start and end pointers in the Replication Space Directory 306. In one embodiment, each replica node reports acknowledgment of the recovery completion (block 1112).

In block 1114, software makes one of the replica nodes the new local node and setup for memory replication begins as described above and shown in FIG. 8.

It is noted that the above-described embodiments may comprise software. In such an embodiment, the program instructions that implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/ or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   (A) a first processing node comprising a first wiretap circuitry and a first memory, wherein the first memory comprises a primary portion;
   (B) a second processing node comprising a second memory, wherein the second memory comprises a replica portion, wherein the second node is coupled to the first node via an interconnect;
   wherein the first wiretap circuitry is configured to:
   (C) detect all memory accesses which cause changes to data stored in the primary portion initiated by a processing unit within the first node; and
   (D) convey a first indication for writing back dirty cache lines within one or more caches within the processing unit to the first memory, wherein one or more of the dirty cache lines correspond to the primary portion, in response to detecting a the memory access corresponding to a checkpoint function;
   wherein the second node is configured to:
   (E) store within a replica portion included in the second memory data indicative of said all memory accesses, thereby maintaining an up to date copy of data stored in the primary portion;
   (F) wherein in response to the second processing node receiving data indicative of the memory access operation to the primary portion, the second node is configured to: modify the replica portion in a manner equivalent to a modification of the primary portion by the memory access operation, thereby maintaining an up to date copy of data stored in the primary portion; and
   (G) update an undo log in the second memory to reflect said modification to the replica portion;
   (H) wherein the second node is further configured to utilize the undo log to undo said modification to the replica portion, and
   (I) wherein the second node is operable to continue execution of a software application corresponding to the primary portion in response to detection of a fault during execution of the software application on the first processing node.

2. The system as recited in claim 1, wherein the second node conveys a second indication to the first wiretap circuitry in response to the replica portion being updated with said written-back dirty cache lines.

3. The system as recited in claim 2, wherein said second indication further indicates the replica portion stores a current copy of the first portion.

4. The system as recited in claim 2, wherein, in response to receiving said second indication, the first wiretap circuitry is further configured to convey a third indication to the processing unit for continuing execution of a software application halted in response to said checkpoint function.

5. The system as recited in claim 1, wherein the second node is configured to clear the undo log in response to the replica portion is updated with said evicted modified data.

6. A computerized method comprising:
   detecting memory access which cause changes to data stored in a primary portion of a first memory in a first processing node comprising a first wiretap circuitry and a first memory, wherein the first memory comprises a primary portion;
   (B) a second processing node comprising a second memory, wherein the second memory comprises a replica portion, wherein the second node is coupled to the first node via an interconnect;
   wherein the first wiretap circuitry is configured to:
   (C) detecting all memory accesses which cause changes to data stored in the primary portion initiated by a processing unit within the first node; and
   (D) conveying a first indication for writing back dirty cache lines within one or more caches within the processing unit to the first memory, wherein one or more of the dirty cache lines correspond to the primary portion, in response to detecting a the memory access corresponding to a checkpoint function;
   wherein the second node is configured to:
   (E) storing within a replica portion included in the second memory data indicative of said all memory accesses, thereby maintaining an up to date copy of data stored in the primary portion;
   (F) wherein in response to the second processing node receiving data indicative of the memory access operation to the primary portion, the second node is configured to: modify the replica portion in a manner equivalent to a modification of the primary portion by the memory access operation, thereby maintaining an up to date copy of data stored in the primary portion; and
   (G) update an undo log in the second memory to reflect said modification to the replica portion;
   (H) wherein the second node is further configured to utilize the undo log to undo said modification to the replica portion, and
   (I) wherein the second node is operable to continue execution of a software application corresponding to the primary portion in response to detection of a fault during execution of the software application on the first processing node.

7. The method as recited in claim 6, further comprising conveying a second indication to the first wiretap circuitry from the second node, in response to the replica portion within the second memory being updated with said written-back dirty cache lines.

8. The method as recited in claim 7, wherein said second indication further indicates the replica portion stores a current copy of the first portion.

9. The method as recited in claim 7, further comprising, in response to receiving said second indication, conveying a third indication to the processing unit for continuing execution of a software application halted in response to said checkpoint function.

10. The method as recited in claim 7, further comprising clearing the undo log in response to the replica portion is updated with said evicted modified data.

11. A wiretap unit comprising:
   a first interface configured to communicate with one or more processing units in a first processing node;
   a second interface configured to communicate with a network;
   one or more directories configured to store data corresponding to memory accesses within the first processing node; and
   control circuitry;
   wherein in response to detecting a memory access which causes changes to data stored in a primary portion of a first memory in the first processing node, the control circuitry is configured to:
   (A) the first processing node comprising a first wiretap circuitry and a first memory, wherein the first memory comprises a primary portion;
   (B) the second processing node comprising a second memory, wherein the second memory comprises a replica portion, wherein the second node is coupled to the first node via an interconnect;
   wherein the first wiretap circuitry is configured to:
   (C) detect all memory accesses which cause changes to data stored in the primary portion initiated by a processing unit within the first node; and
   (D) convey a first indication for writing back dirty cache lines within one or more caches within the processing unit to the first memory, wherein one or more of the dirty cache lines correspond to the primary portion, in response to detecting a the memory access corresponding to a checkpoint function;
   wherein the second node is configured to:
   (E) store within a replica portion included in the second memory data indicative of said all memory accesses, thereby maintaining an up to date copy of data stored in the primary portion;
   (F) wherein in response to the second processing node receiving data indicative of the memory access operation to the primary portion, the second node is configured to: modify the replica portion in a manner equivalent to a modification of the primary portion by the memory access operation, thereby maintaining an up to date copy of data stored in the primary portion; and
   (G) update an undo log in the second memory to reflect said modification to the replica portion;
   (H) wherein the second node is further configured to utilize the undo log to undo said modification to the replica portion, and
   (I) wherein the second node is operable to continue execution of a software application corresponding to the primary portion in response to detection of a fault during execution of the software application on the first processing node.

12. The wiretap unit as recited in claim 11, wherein the control circuitry is further configured to convey a second indication, in response to the replica portion being updated.

13. The wiretap unit as recited in claim 12, wherein the control circuitry is further configured to convey said second indication to indicate the replica portion stores a current copy of the first portion of the second memory.

* * * * *